Patented July 19, 1938

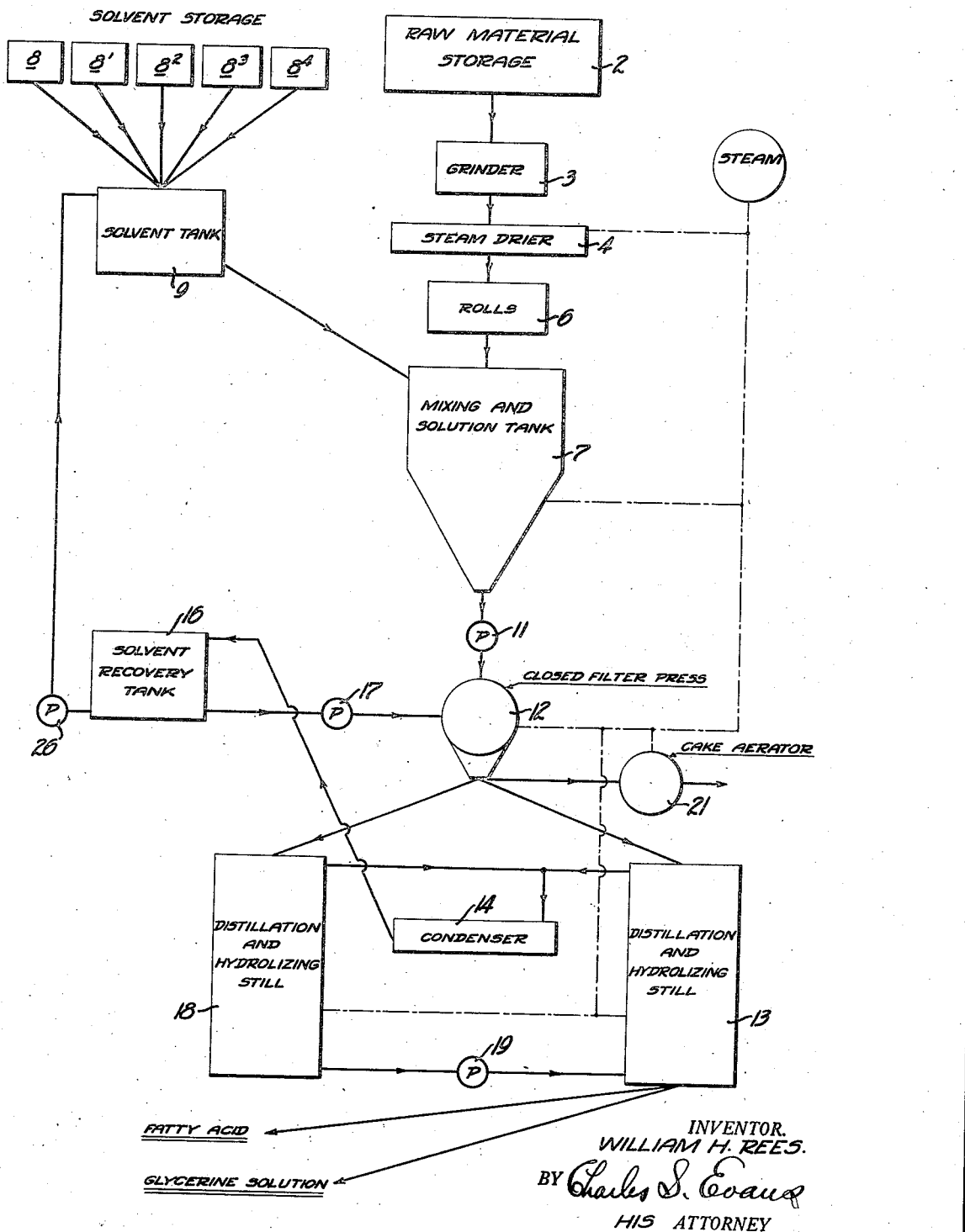

2,124,168

UNITED STATES PATENT OFFICE 2,124,168

METHOD OF PRODUCING GLYCERINE AND FATTY ACIDS

William H. Rees, Berkeley, Calif., assignor to El Dorado Oil Works, San Francisco, Calif., a corporation of California Application October 17, 1934, Serial No. 748,640

8 Claims. (Cl. 87—4)

My invention relates to the production of glycerine and fatty acids and one of the objects of the invention is the separation of these products directly from oleaginous material without first extracting oil therefrom.

Another object of the invention is the production of glycerine and fatty acids by a simplified method eliminating the use of hydraulic presses, thus materially reducing the cost of the operation and the time required to perform it.

Another object of the invention is the production of a nutritious commercial stock feed from the solid residue resulting after treating the oleaginous material to remove the glycerine and fatty acids.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

The drawing is a flow sheet showing the various steps required to perform the process of my invention.

It is well known in the chemical art, that certain chemicals have, under proper conditions of moisture and temperature, the property of hydrolyizing or saponifying oils and fats so that they are decomposed into their constituents, glycerine and fatty acids. One of the chemicals most commonly used is sulphuric acid, which, under heat and moisture, has a very active hydrolizing effect and it is universally employed by candle and soap manufactures. In the process as commonly carried out, certain other chemicals which act as catalysts are added to the sulphuric acid to quicken and facilitate the action. The preparation of the catalytic compounds adapted for this use has become a commercial enterprise. These compounds are generally referred to as "Twitchelling reagents", and some of those best known are sold under the trade names of "Idrapid", "Dilvulsin", "Kontakt", "Pfeilring" and "Twitchell." The reaction of the hydrolizing material in the presence of pulp is so retarded that it is necessary to express the oil from its carrying material, whether pulp or cellular material, and render the oil as pure as practicable before the hydrolyzing, commonly known as "Twitchelling", is carried on.

In terms of broad inclusion, the process of my invention comprises the reduction of the raw animal or vegetable matter to a pasty mass and then driving off most of the contained moisture. To this mass is added a reagent in solution and comprising alcohol, sulphuric acid, fatty acid, benzol, and a catalyst. After thoroughly agitating and heating this mass it is filtered and the chemicals, glycerine and fatty acids are carried off in the solution, and treated in a still to separate and recover each of these ingredients. The solid matter containing the sugars, proteins and other foods remain in the press and after being thoroughly washed and dried are sold as stock feed.

In greater details the raw oil bearing materials, such as cocoanuts, peanuts, animal matter or any other suitable material is taken from the suitable storage hopper or bin 2 and passed into a grinder 3. When the grinding process has reduced the raw material to the proper fineness, the mass is conveyed to a steam drier 4, and the moisture content reduced to as low a percentage as is practicable; for example, preferably three per cent or less since the presence of any appreciable amount of water brings about an undesirable reaction and makes the mixture more difficult to handle and filter. When a previously dried material, such as copra, is being treated, the drying step may be omitted if desired as the moisture content is so low that the process may be carried on without serious interference. From the drier the material is discharged onto the rolls 6, where the pulping is continued until the material has been ground as fine as possible.

The thoroughly mascerated pulp is now conveyed into a batch mixer 7 of suitable size, which for the present process should have a capacity capable of handling one ton of mascerated copra pulp and the solutions required to carry out the process. At this time the material should have a consistency similar to peanut butter as sold for table use. If the raw material used has been previously dried, such for example as dried cocoanut meat, commercially known as copra, and the oil content is insufficient to produce the desired fluidity of the mass, a sufficient quantity of fatty acid derived from the same kind of material may be added and mixed with the material until a smooth paste is obtained. Any deficiency in fluidity of the mass during this stage of the process may be corrected by the addition of fatty acids which were produced from a previous batch and which are recovered during a later step in the process.

When the proper condition of fluidity has been obtained about 75 gallons of a reagent solution, preferably of acid character, are added, thoroughly agitated and heated to approximately 90° C. The reactions of this solution are of complex nature and produce very definite effects upon the solid matter of the raw material as well as upon the oil content thereof. This step is of the utmost importance, and in order to fully appreciate the invention a full discussion of the action of the reagent solution and its composition is necessary.

One of the primary objects of this invention is the production of a nutritious stock feed from the solid residue of the oleaginous material being treated. It is desirable that all food ingredients such as sugars, soluble cellulose and proteins be retained so that the food value will be as high as possible. On the other hand it is essential that the residue contain no harmful chemicals and that its taste and odor be wholesome. It is therefore necessary that a reagent be compounded which will coagulate the albumins or proteins, digest the cellulose, penetrate the cellular matter and dissolve the oil, prevent the extraction of sugars from the solid matter and yet leave no traces in the residue which would impair its value as a stock feed.

With the foregoing requirements before me I have found that a reagent made of the following ingredients in the proportions stated produces a highly satisfactory result:

Alcohol (commercial) _____ gallons__ 25
Sulphuric acid _____ pounds__ 10
Cocoanut oil fatty acid _____ gallons__ 25
Benzene or naphthalene sulphonic acid (or any suitable commercial catalyst) ____ pounds__ 10
Benzole (commercial) _____ gallons__ 25

The sulphuric acid dissolves in alcohol making approximately an 8 per cent solution of sulphuric acid in alcohol. The fatty acids will dissolve the catalyst making a 5 per cent solution of the catalyst used. These two solutions are then combined and a perfectly clear fluid results. The benzole is then added and the resultant mixture remains a clear solution. While I prefer to mix the ingredients of the reagent solution in this sequence, an entirely satisfactory result will be obtained if they are merely mixed together. The proportion given may be varied within a range of 10 or even 15 percent of those given without materially affecting the result.

Different materials will require different amounts of this reagent to accomplish the desired result. The filtrate should show a mineral acid content of ½% to 1% in order to complete the process. If this acid content is deficient the amount of reagent used should be increased.

The action of the various ingredients in the reagent upon each other and upon the material being treated is interesting. The sulphuric acid coagulates the albumin or protein so that they remain with the solid matter. The acid also aids in digesting the cellulose and in dissolving the oil content of the material. The proper dilution of the acid is accomplished by the use of alcohol and benzole. Commercial alcohol alone dissolves sugars and is not a good solvent for extracting oil, but in the presence of benzole it does not dissolve the sugars and the two become a splendid oil solvent and penetrate the cellular structure to dissolve out the oil content. The addition of the non-volatile fatty acid aids in dissolving the oil content and reduces the fire hazard occasioned by the volatile alcohol and benzole. The fatty acids are also used to thin the mixture if necessary to facilitate the handling of the material.

The ingredients of the reagent solution are stored separately in the containers, 8, 8¹, 8², 8³ and 8⁴ and discharged into the solution tank 9 as required. The solution is conveyed from the tank 9 to the batch mixer 7 where it is combined with the prepared raw material. After the 75 gallons of the reagent have been added to the one ton of prepared raw copra pulp, the two are agitated and heated until the cellular structure has been penetrated and the oil content dissolved.

The mass is next passed by means of any suitable pump 11 into a closed filter press 12 where the solids are retained and the liquid run off into a recovery still 13. The still is provided with both open and closed steam coils preferably made of acid resisting metal. The steam is turned on in the coil to bring the liquid to a temperature to distill off the volatile portions of the reagent solution. During this heating a considerable amount of steam is condensed and becomes added water in the liquids causing the acid to react bringing about a hydrolizing of the oil in solution to separate the fatty acids and glycerine. This step may be hastened by adding water and in some instances when the acid content is deficient, a small amount of sulphuric acid may be required.

The volatile portions of the reagent are carried into the condenser 14, where they are condensed and led into the storage tank 16. A pump 17 then forces these condensates through the solids left in the filter press 12 to wash them free of any retained fatty acids or reagent solution. If desirable a little more benzole may be added during the washing process to speed up the cycle. The first of these washings is preferably run into the still 13, but the wash liquors become very dilute after a short time, so that time is saved if the dilute liquors are run into a second still 18 while the process is continued in the still 13. This latter still is also connected with the condenser 14 where the alcohol and benzole are condensed after washing the solid matter. A connection is also provided between the still 18 and the still 13 so that the concentrated non-volatile solution may be forced by the pump 19 into the still 13. The provision of the auxiliary still 18 is optional. Its use expedites but does not alter the essential character of the process.

While the washing of the solids is taking place, the volatile solvents will have been driven out of the still 13; and because of the presence of the water and sulphuric acid the hydrolization of the oil bearing solution is carried well toward completion. The solution then remaining in the still 13 may be withdrawn and the process completed in less costly apparatus, or it may be left in the still and completed there. In either case the fatty acids will form in an upper layer in the receptacle and the glycerine will be contained in the lower aqueous solution in the tank. The two layers are separated and the ingredinets recovered in accordance with well known and customary methods.

After washing of the solids in the press 12 has been completed, the pump 17 is stopped and dry steam is blown through the press until all the benzole is displaced. The solids are then moved by a suitable conveyor to an aerator 21 where the odor of the benzole is removed and moisture supplied to condition it for market as a nutritious stock feed.

It will be apparent that the volatile portion of the hydrolizing solution may be recovered and used over many times, and a pump 26 is preferably provided for conveying the condensed materials collected in the tank 16 back to the tank 9. However, if desired, these ingredients may be separated and returned to their respective storage containers.

I claim:

1. The process of extracting fatty acids and glycerine directly from oleaginous pulp material which comprises the steps of reducing the material to a finely divided paste having a moisture content of not more than about 3%, adding fatty acids to thin the material, adding a reagent comprising sulphuric acid, alcohol, a hydrolyzing catalyst, and benzole, heating and agitating the mixture, filtering the liquid from the solid matter, introducing water into the liquid and thereafter heating the liquid for concurrently evaporating the solvent and hydrolyzing dissolved oil for producing fatty acids and glycerine.

2. The process of extracting fatty acids and glycerine directly from oleaginous pulp material which comprises the steps of reducing the material to a finely divided paste having a moisture content of not more than about 3%, adding a reagent comprising sulphuric acid, alcohol, a hydrolyzing catalyst, fatty acids and benzole, heating and agitating the mixture, filtering the liquid from the solid matter, introducing water into the liquid and thereafter heating the liquid for concurrently evaporating the solvent and hydrolyzing dissolved oil for producing fatty acids and glycerine.

3. The process of extracting fatty acids and glycerine directly from oleaginous pulp material which comprises the steps of reducing the material to a finely divided paste having a low moisture content, adding fatty acids to correct the fluidity of the mass, adding an oil solvent reagent comprising sulphuric acid, alcohol, a hydrolyzing catalyst, fatty acids, and benzole, agitating and heating the mixture to about 90° C., filtering the liquid from the solid matter, adding water to the liquid, applying heat to the liquid and water for concurrently distilling off the volatile portions of the reagent and hydrolyzing oil dissolved therein, and separating the fatty acids and glycerine from the remaining liquid.

4. The process of extracting fatty acids and glycerine directly from oleaginous pulp material which comprises the steps of reducing the material to a finely divided paste having a low moisture content, adding a reagent to dissolve the oil content without removing the sugar and protein content of the material, said reagent comprising sulphuric acid, alcohol, a hydrolyzing catalyst, fatty acids and benzole, heating and agitating the mixture, filtering the liquid containing the oil in solution from the solid matter, adding water and heating the liquid to produce the fatty acids and glycerine.

5. The process of extracting fatty acids and glycerine directly from oleaginous pulp material which comprises the steps of reducing the material to a finely divided paste having a low moisture content, adding a reagent to dissolve the oil content of the material, said reagent comprising sulphuric acid, alcohol, a hydrolyzing catalyst, fatty acids and benzole, heating and agitating the mixture, filtering the liquid containing the oil in solution from the solid matter, adding water and distilling said liquid to simultaneously recover the volatile portions of the reagent and to produce fatty acids and glycerine.

6. A reagent for use in producing fatty acids and glycerine directly from oleaginous pulp materials without materially reducing the sugar and protein content thereof and without first isolating the oil which comprises alcohol, sulphuric acid, a hydrolyzing catalyst and benzole.

7. A reagent for use in producing fatty acids and glycerine directly from oleaginous pulp materials without materially reducing the sugar and protein content thereof and without first isolating the oil which comprises alcohol, sulphuric acid, a hydrolyzing catalyst, benzole and fatty acid.

8. An oil solvent reagent for use in producing fatty acids and glycerine directly from oleaginous pulp materials without materially reducing the sugar and protein content thereof and without first isolating the oil which comprises

| | | |
|---|---|---|
| Alcohol (commercial) | gallons | 25 |
| Sulphuric acid | pounds | 10 |
| Cocoanut oil fatty acid | gallons | 25 |
| Benzene sulphonic acid | pounds | 10 |
| Benzole (commercial) | gallons | 25 |

WILLIAM H. REES.